(12) United States Patent
Newbould

(10) Patent No.: US 6,874,773 B1
(45) Date of Patent: Apr. 5, 2005

(54) MODULAR INDEXING WORKHOLDING SYSTEM

(76) Inventor: Richard Joseph Newbould, P.O. Box 1146, Hernando, FL (US) 34442

(*) Notice: Subject to any disclaimer, the term of this patent is extended or adjusted under 35 U.S.C. 154(b) by 0 days.

(21) Appl. No.: 10/730,570

(22) Filed: Dec. 8, 2003

(51) Int. Cl.⁷ ................................ B23Q 3/18
(52) U.S. Cl. .......................... 269/63; 269/73
(58) Field of Search .................. 269/63, 71–73, 269/58, 95, 309

(56) References Cited

U.S. PATENT DOCUMENTS

| | | | |
|---|---|---|---|
| 5,816,568 A | * | 10/1998 | Fox .............................. 269/60 |
| 5,984,291 A | * | 11/1999 | Iwata et al. .................... 269/73 |
| 6,648,318 B1 | * | 11/2003 | Oetlinger et al. ............. 269/41 |

* cited by examiner

Primary Examiner—Lee D. Wilson

(57) ABSTRACT

A modular workholding system for holding workpieces while performing machining or inspection, enabling adjustment of the attitude of the workpiece to various predetermined positions relative to the machine base, and utilizing one or more pairs of cooperating interlocking mechanism, such as serrated-tooth face gears.

4 Claims, 4 Drawing Sheets

MODULAR INDEXING WORKHOLDING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

This invention relates generally to machining, and more specifically to precisely holding a workpiece for wire electrical discharge machining.

It is often a requirement to hold a workpiece in a specific position for a machining operation, then rotatably index it about an axis to a different angular position for another operation. Additionally, for subsequent operations, it may be a requirement to change the axis of rotation to a different angle relative to the machine base than on the first operation.

It is also beneficial to have the lowermost part of the workpiece in close proximity to the lower wire guide of the machine. Prior art does not facilitate a change in elevation of the workpiece.

In prior art these things are not easily accomplished and the machinist must often create special tooling to obtain the desired effect.

Since wire electrical discharge machining is often done submerged in water, it is also necessary to have the workholding tool unaffected by the water, therefore prior art would seal the internal mechanisms to prevent contamination.

BRIEF SUMMARY OF THE INVENTION

The present invention provides a fixture to allow the placement of a workpiece at a predetermined angular adjustment relative to the machine base, adjust the elevation of the workpiece to the optimum location, and rotationally index the workpiece. Further, the present invention allows the machinist to change the rotational axis to a different predetermined angle relative to the machine base, and to change the elevation, all without disturbing the clamping of the workpiece. The present invention also allows the machinist to remove the workpiece from the machine for inspection, and return it to the machine without losing position of the workpiece relative to the machine.

The present invention also is designed to be unaffected by contaminated water or dialectric fluid entering its internal cavities, therefore needs no seal or pressurization.

The present invention is designed in a modular fashion to provide with a basic workholding indexing head which can be simply mounted to the machine table, or used with cooperating attachments to provide the additional features necessary for the particular job requirements.

DETAILED DESCRIPTION OF THE INVENTION

Figure 1:
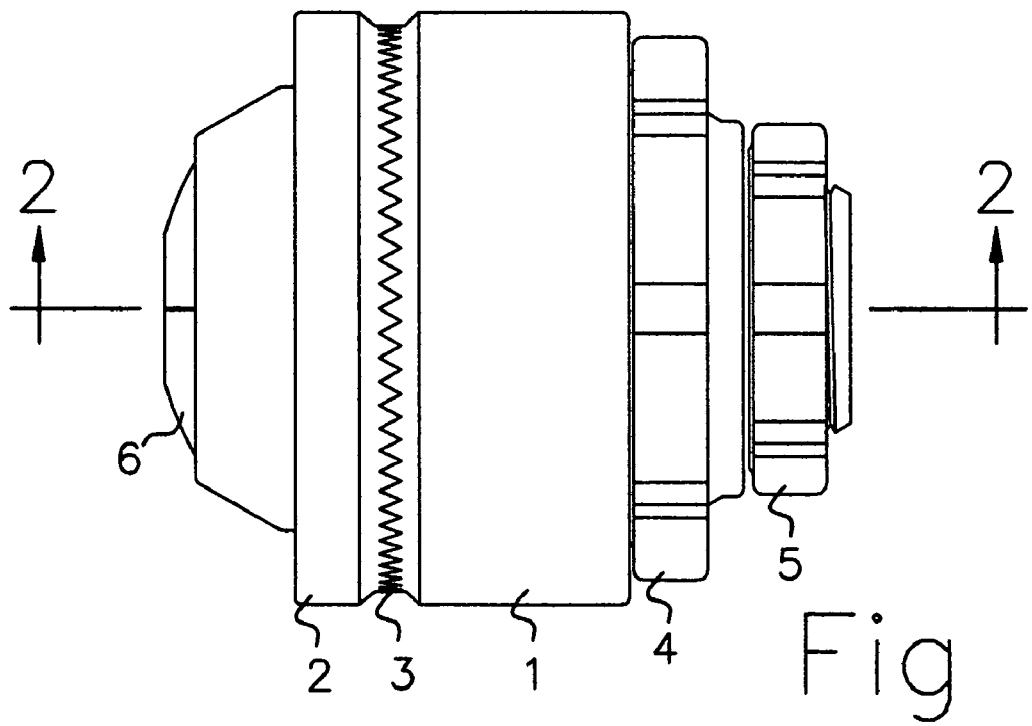
FIG. 1 is an external view of the basic indexing head showing the primary indexing system, and shown with a collet holder holding a collet.
Figure 2:
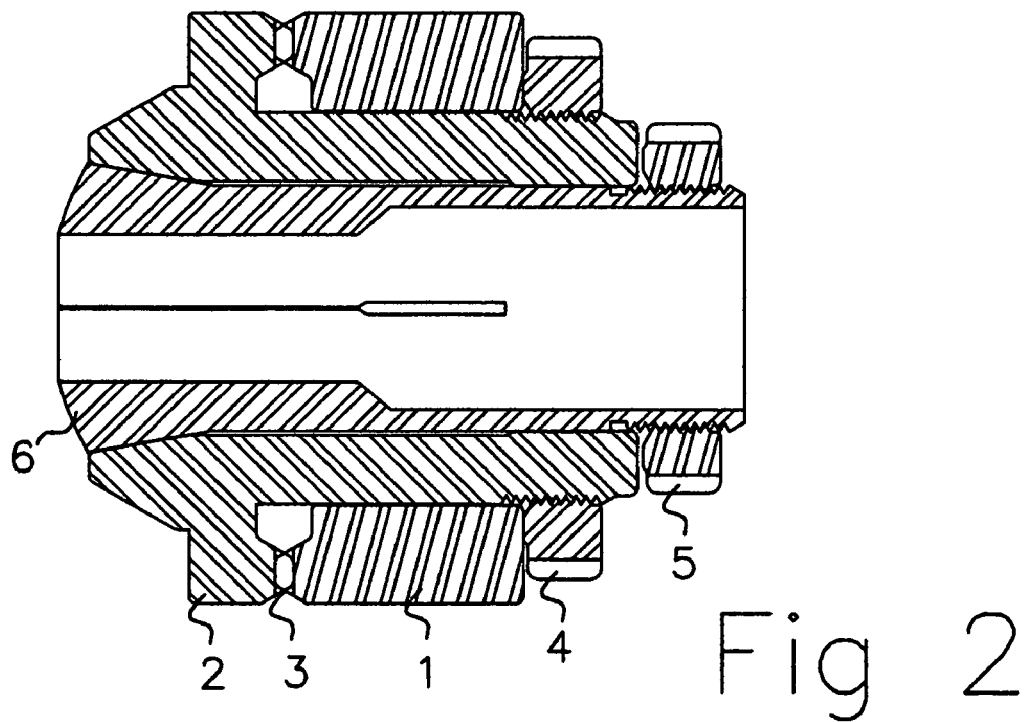
FIG. 2 is a cross section of FIG. 1 showing the internal arrangements of the collet holder and collet.

FIGS. 1 and 2 illustrate the indexing head meant to be the basic assembly of the modular system, and can be used alone if desired. The body 1 has radially spaced interlocking surfaces 3 which engage with matching interlocking surfaces on the workholding member 2. There is ample diametral clearance between the inside diameter of 1 and the outside diameter of 2 to allow contaminated liquids to not interfere with normal operation.

Indexing is achieved by loosening nut 4 and extracting workholder 2 a sufficient distance to allow rotation of the workholder to a desired postion wherein nut 4 can be tightened to re-engage the interlocking surfaces 3 located on body 1 and workholder 2.

In the embodiment illustrated, a workpiece is clamped in the collet 6 by tightening nut 5 on the back of the collet. The entire assembly of workpiece, workholder 2, collet 6 and nut 5 can be removed from the body by removing nut 4 and sliding the said assembly out the front end of the body. The nut 5 is smaller than the inside diameter of nut 4. Thus the workpiece can be removed from the machine for inspection without disturbing the clamping of the workpiece. The workpiece, still held in the collet, can then be replaced into the body 1 without losing its critical positioning in the machine.

The preferred embodiment described herein is exemplary and not meant to limit workholding to the collet 6 shown contained within the workholder 2. The workholder 2 can be configured to accommodate various chucks, or many other holding methods.

Figure 3:
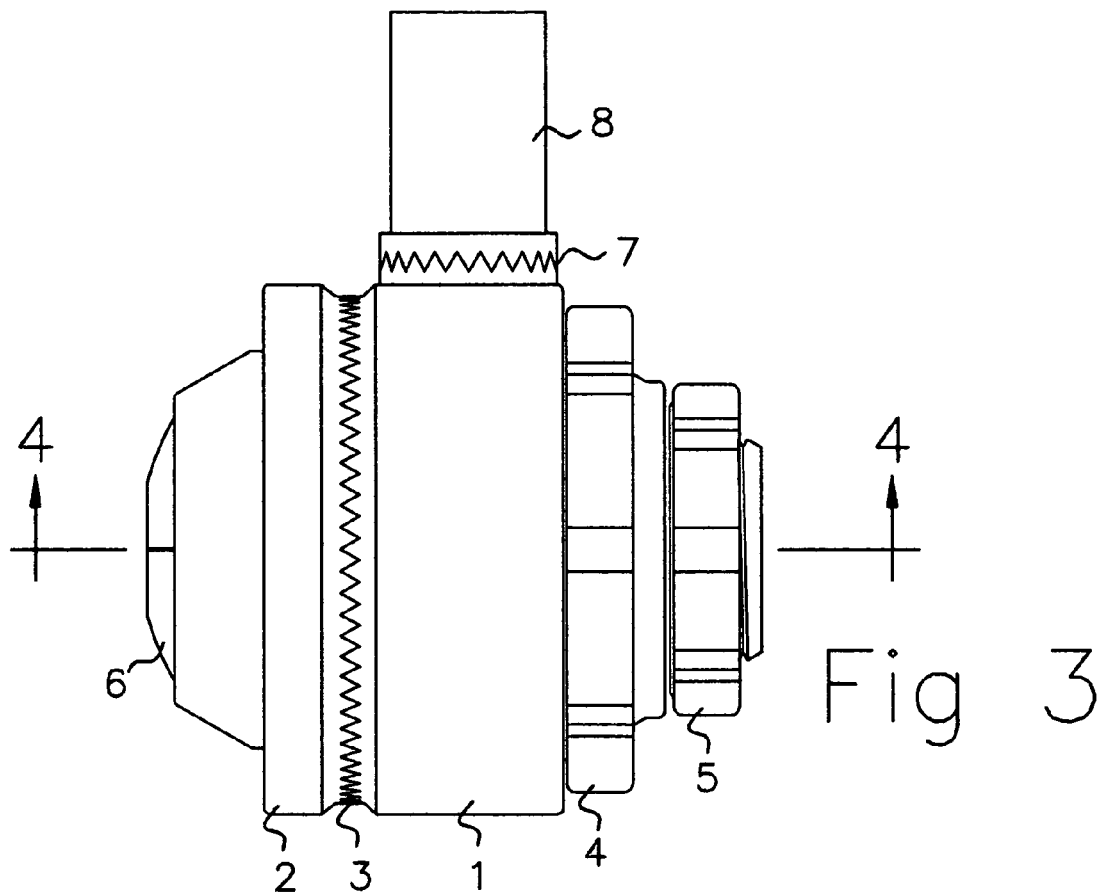
FIG. 3 is an external view of the basic indexing head with the addition of a secondary rotary indexing system with a rotational axis at a 90 degree angle to the rotary axis of the primary indexing system.
Figure 4:
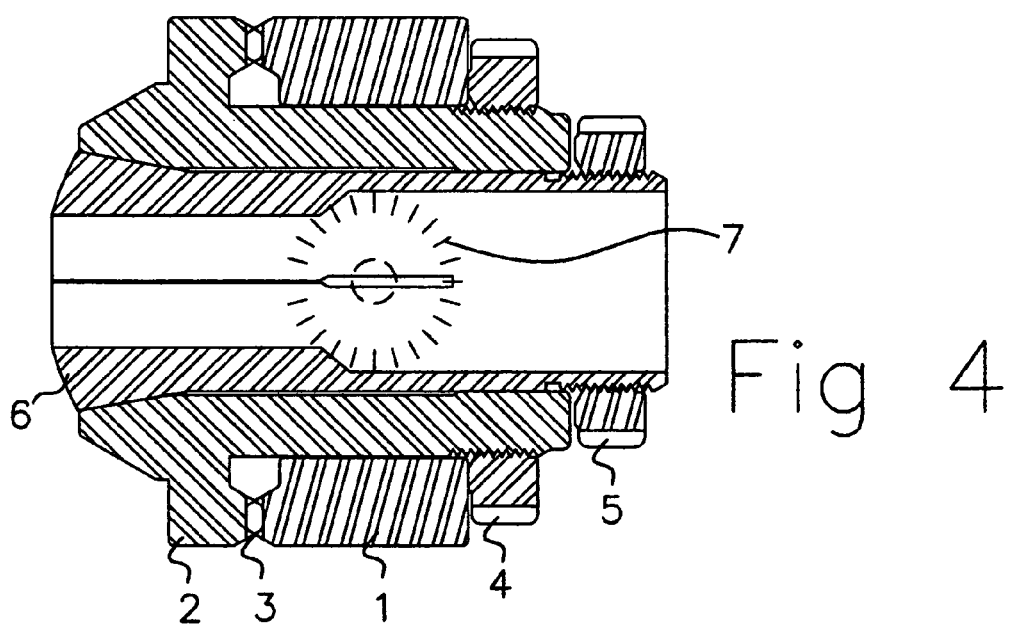
FIG. 4 is a cross section of FIG. 3 showing the hidden lines of the secondary indexing system.

FIG. 3 shows the indexing head with the addition of a secondary pair of radially spaced interlocking surfaces 7 which has an axis of rotation perpendicular to the axis of rotation of interlocking surfaces 3. This allows the member 8 which has ½ of the pair of interlocking surfaces, to be clamped into a suitable holding means stationary to the base of the machine. A clamping force, such as provided by a screw, passes through member 8 to lock the interlocking surfaces together in the desired position. The result is that the indexing head can be locked at a predetermined angular position relative to the machine base. FIG. 4 is a sectional view of the assembly which shows the location of the radially spaced interlocking surfaces 7, with the use of hidden lines.

Figure 5:
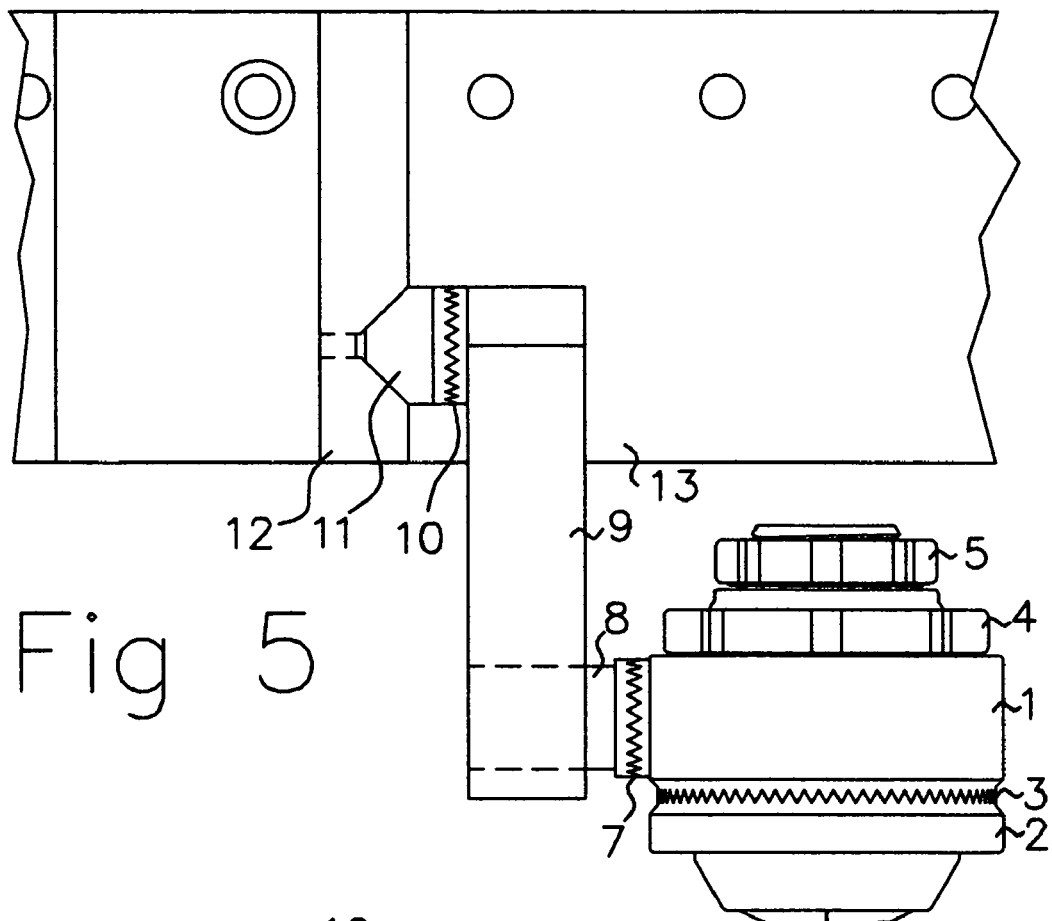
FIG. 5 is the top view of an assembled modular system.

FIG. 5 is a top view of a preferred embodiment of a completed modular system. Additionally illustrated is arm 9 with ½ of the pair of radially spaced interlocking surfaces 10, a sliding member 11 which has the other ½ of the interlocking surfaces of 10. An angle plate 12 which is clamped to the machine base 13. Angle plate 12 has a vee groove to accommodate the shape of the sliding member 11. This arrangement allows the assembly to be adjusted along the vertical axis of the machine to the desired height without affecting the angularity of the indexing head relative to the machine base 13.

The machine base 13 is commonly raised to just above the upper surface of the lower wire guide. The assembly illustrated allows the indexing head to be lowered within the body of the machine so that the center of the axis of rotation can be lowered to this height, thus, even a small diameter workpiece can be lowered to the optimum height just above the lower wire guide.

Figure 6:
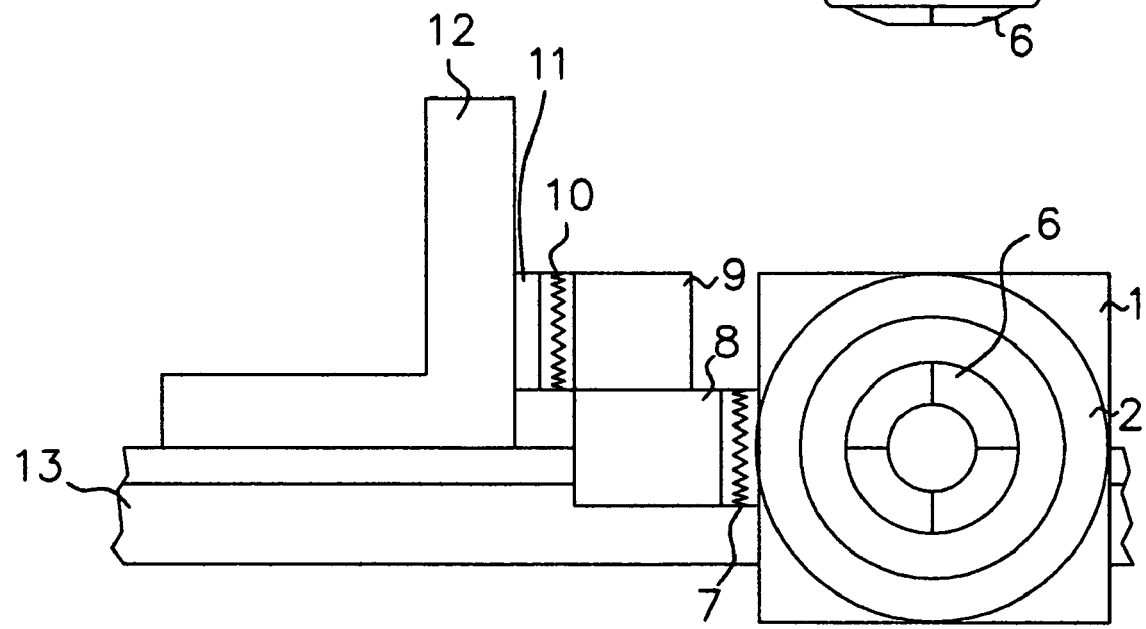
FIG. 6 is the side view of the assembled modular system.

FIG. 6 is a front view of the assembly at its lowest adjusted height.

Figure 7:
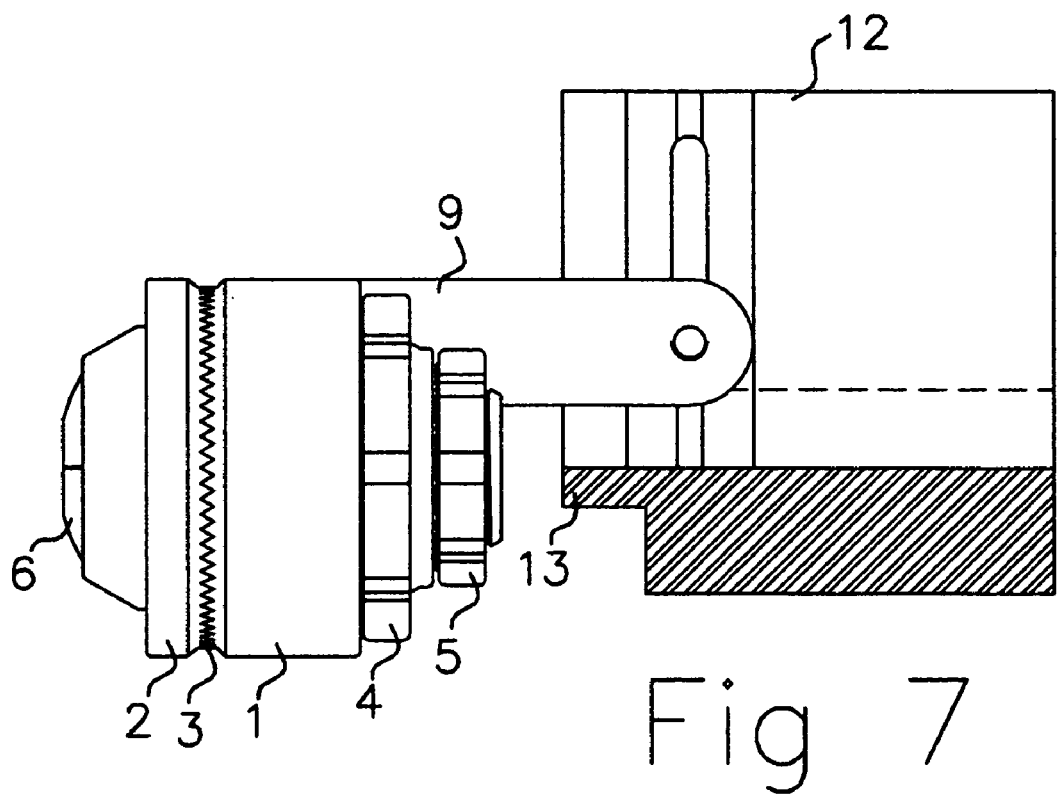
FIG. 7 is the front view of the assembled modular system.

FIG. 7 is a side view of the assembly on a cross section of the machine base 13 with the indexing head lowered to the extent that its center of rotation is on a plane with the machine base 13.

Figure 8:
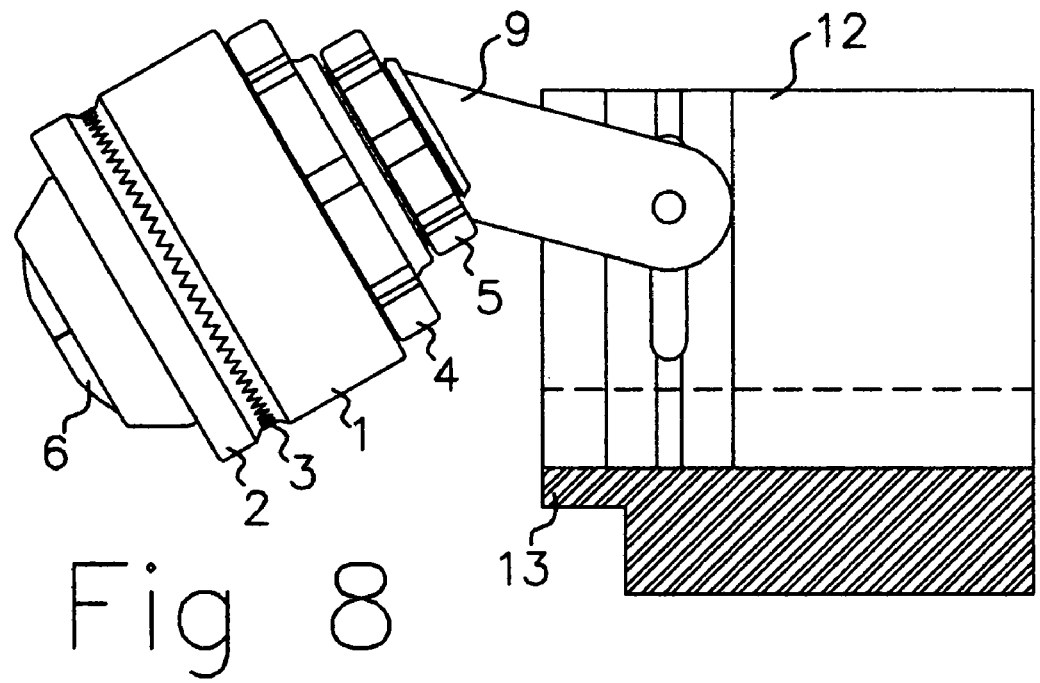
FIG. 8 is the side view of the assembled modular system wherein the basic indexing head has been articulated to a higher elevation and different angle.

FIG. 8 illustrates an example of positioning obtained by utilizing the locking surfaces 7 and 10, and by sliding member 11 higher in the vee of angle plate 12. While these illustrations represent a preferred embodimant of the system, they are not meant to be limited to the specifics shown.

With this system, a machinist can rapidly position the indexing head at a desired angularity without the need of an auxiliary angle setting procedure, and without the need to unclamp the workpiece.

It is to be understood that the present invention is by no means limited only to the particular constructions herein disclosed and shown in the drawings, but also comprises any modifications or equivalents within the scope of the claims.

What is claimed is:

1. An apparatus comprising a body having an opening for internal parts whereby any part of a workholder having an opening for internal parts which is inserted into said body forms a clearance to allow contamination to be non-interfering with adjacent surfaces of said workholder, and said body and workholder have radially spaced coengaging interlocking surfaces for angular indexing wherein said adjacent surfaces of the workholder and body are non-planar with the radially spaced interlocking surfaces of said body and workholder and a retaining mechanism.

2. The apparatus as in claim 1 with an additional set of rotary interlocking surfaces whose axis of rotation is perpendicular to the axis of rotation of the workholder allowing the attachment of a modular positioning element.

3. The apparatus as in claim 2 which has said modular attachments which have rotary interlocking surfaces to engage the second set of interlocking surfaces of the body allowing angular indexing of the body while the modular positioning element is mounted to a plate which is mounted to a machine base.

4. The apparatus as in claim 3 wherein the plate has a vertical shape to match the modular positioning element, allowing the body and workholder to be adjusted vertically without changing the relative angle of the body and workholder to the machine base, and allowing the axis of rotation to be lowered to the extent that the axis of rotation of the workholder is on a plane with the machine base.

* * * * *